(12) United States Patent  
Anderson et al.

(10) Patent No.: US 7,496,425 B2  
(45) Date of Patent: *Feb. 24, 2009

(54) MICROLOGISTICS TRACKING SYSTEM FOR AN AUTOMATED MANUFACTURING FACILITY

(75) Inventors: Thomas E. Anderson, Hyde Park, NY (US); Patrick M. Flaherty, Pleasant Valley, NY (US); Jeffrey P. Gifford, Fishkill, NY (US); Nathaniel C. Lange, Newburgh, NY (US); Ray A. Reyes, New Windsor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/867,875

(22) Filed: Oct. 5, 2007

(65) Prior Publication Data

US 2008/0071411 A1 Mar. 20, 2008

Related U.S. Application Data

(63) Continuation of application No. 11/533,385, filed on Sep. 20, 2006, now Pat. No. 7,302,307.

(51) Int. Cl.  
*G06F 19/00* (2006.01)

(52) U.S. Cl. .................. 700/121; 700/95; 700/117; 717/170

(58) Field of Classification Search .......... 700/95, 700/96, 97, 99, 117, 121; 717/170  
See application file for complete search history.

(56) References Cited

U.S. PATENT DOCUMENTS

| | | | |
|---|---|---|---|
| 6,470,227 B1 | 10/2002 | Rangachari et al. | |
| 6,748,282 B2 * | 6/2004 | Lin | 700/95 |
| 6,810,294 B2 | 10/2004 | Rangachari et al. | |
| 2003/0176940 A1 * | 9/2003 | Rangachari et al. | 700/121 |
| 2004/0039469 A1 | 2/2004 | Lin | |
| 2005/0010311 A1 | 1/2005 | Barbazette et al. | |
| 2005/0075748 A1 | 4/2005 | Gartland et al. | |
| 2005/0228530 A1 * | 10/2005 | Chang et al. | 700/121 |
| 2006/0190118 A1 * | 8/2006 | Teferra et al. | 700/112 |

* cited by examiner

*Primary Examiner*—Albert Decady  
*Assistant Examiner*—Douglas S Lee  
(74) *Attorney, Agent, or Firm*—Cantor Colburn LLP; Kerry Goodwin

(57) ABSTRACT

A computing system for monitoring activity in an automated fabrication facility includes a computer operably coupled to an MES (Manufacturing Execution Systems) database having data relating to manufacturing operation events; and the computer also being operably coupled to an AMHS (Automated Material Handling Systems) database having data relating to movement of the work-in-process material lots between the manufacturing operations and the storage operations; and a solver product operatively installed on the computer for processing information regarding timing of the events and information regarding operation of the automated material handling system to generate a report regarding performance of the automated fabrication facility, wherein the report identifies information regarding a sequence of events having occurred in the manufacturing process.

9 Claims, 5 Drawing Sheets

```
Time 1:  Lot A, Oper X, Stocker 1, Reserve Start
Time 2:  Lot A, Oper X, Stocker 1, Reserve Complete
Time 3:  Lot A, Oper X, Stocker 1, Unload Complete
Time 4:  Lot A, Oper X, Tool 1, Load Complete
→ Time 5:  Lot A, Oper X, Tool 1, Oper Start
Time 6:  Lot A, Oper X, Tool 1, Process Start
Time 7:  Lot A, Oper X, Tool 1, Process Complete
→ Time 8:  Lot A, Oper X, Tool 1, Oper Complete
Time 9:  Lot A, Oper X, Tool 1, Unload Request (Eqp)
Time 10: Lot A, Oper X, Tool 1, Unload Request (Sys)
Time 11: Lot A, Oper X, Tool 1, Unload Complete
Time 12: Lot A, Queued, Stocker 2, Load Complete
Time 13: Lot B, Oper Y, Stocker 2, Reserve Start
Time 14: Lot B, Oper Y, Stocker 2, Reserve Complete
Time 15: Lot B, Oper Y, Stocker 2, Unload Complete
Time 16: Lot B, Oper Y, Tool 3, Load Complete
→ Time 17: Lot B, Oper Y, Tool 3, Oper Start
Time 18: Lot B, Oper Y, Tool 3, Process Start
Time 19: Lot B, Oper Y, Tool 3, Process Complete
→ Time 20: Lot B, Oper Y, Tool 3, Oper Complete
Time 21: Lot B, Oper Y, Tool 3, Unload Request (Eqp)
Time 22: Lot B, Oper Y, Tool 3, Unload Request (Sys)
Time 23: Lot B, Oper Y, Tool 3, Unload Complete
Time 24: Lot B, Queued, Stocker 1, Load Complete Time 25: Lot A, Oper Y, Stocker 2, Reserve Start
Time 26: Lot A, Oper Y, Stocker 2, Reserve Complete
Time 27: Lot A, Oper Y, Stocker 2, Unload Complete
Time 28: Lot A, Oper Y, Tool 4, Load Complete
→ Time 29: Lot A, Oper Y, Tool 4, Oper Start
Time 30: Lot A, Oper Y, Tool 4, Process Start
Time 31: Lot A, Oper Y, Tool 4, Process Complete
→ Time 32: Lot A, Oper Y, Tool 4, Oper Complete
Time 33: Lot A, Oper Y, Tool 4, Unload Request (Eqp)
Time 34: Lot A, Oper Y, Tool 4, Unload Request (Sys)
Time 35: Lot A, Oper Y, Tool 4, Unload Complete
Time 36: Lot A, Queued, Stocker 1, Load Complete
Time 37: Lot B, Oper Z, Stocker 1, Reserve Start
Time 38: Lot B, Oper Z, Stocker 1, Reserve Complete
Time 39: Lot B, Oper Z, Stocker 1, Unload Complete
Time 40: Lot B, Oper Z, Tool 6, Load Complete
→ Time 41: Lot B, Oper Z, Tool 6, Oper Start
Time 42: Lot B, Oper Z, Tool 6, Process Start
Time 43: Lot B, Oper Z, Tool 6, Process Complete
→ Time 44: Lot B, Oper Z, Tool 6, Oper Complete
Time 45: Lot B, Oper Z, Tool 6, Unload Request (Eqp)
Time 46: Lot B, Oper Z, Tool 6, Unload Request (Sys)
Time 47: Lot B, Oper Z, Tool 6, Unload Complete
Time 48: Lot B, Queued, Stocker 2, Load Complete
```

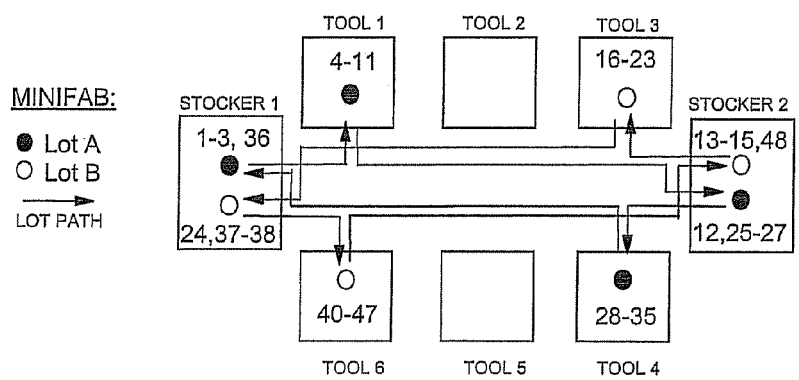

Fig. 3(b)

MICROLOGISTICS TRACKING SYSTEM FOR AN AUTOMATED MANUFACTURING FACILITY

CROSS REFERENCE TO RELATED APPLICATIONS

This application is a continuation of U.S. application Ser. No. 11/533,385, filed Sep. 20, 2006, the contents of which are incorporated herein in their entirety.

BACKGROUND

The present invention relates generally to fully automated systems and methods for operating industrial equipment, such as automated semiconductor manufacturing (fab) facilities and, more particularly, to a micrologistics tracking system for an automated fab.

The efficiency of a manufacturing enterprise depends, in part, on the quick flow of information across its complete supply chain. Off-the-shelf (OTS) enterprise resource planning (ERP) systems were developed and utilized for handling product planning, purchasing, supplier interactions, and customer service and soon gained widespread acceptance. Though useful, these ERP systems were not designed to manage the day-to-day plant-floor operations. Historically, it has been common practice for manufacturers to purchase commercially available Manufacturing Execution Systems (MES) or build their own plant-floor control systems. For example, most semiconductor manufacturers or fabricators (also referred to as "fabs") purchase commercially available MES's or use some form of "home-grown" MES for tracking production logistics, work-in-process (WIP), equipment status, quality, inventory, process controls, etc.

More recent advancements in shop-floor activities include the automation of production equipment, material processing, material control systems, and the integration of all these systems and applications with the host MES. Automating manufacturing processes for certain industries presents many challenges. Unlike the automotive industry, which employs standard assembly line processing techniques, the manufacture of semiconductor materials generally involves non-linear processing techniques. For example, a 300-mm semiconductor fab involves a complex and lengthy back and forth route in which wafers revisit numerous repetitive levels back through process tools while measurements and feedback of measurements are taken. Automating such complex routes requires a great deal of sophistication in its underlying technology.

In addition, Automated Material Handling Systems (AMHS) were developed to move and track material carriers (also referred to as FOUPs or Front Opening Unified Pods and reticle pods) that are routed through a manufacturing facility or bay. These carriers can also be reduced pitch FOUPs, or any other type of wafer carrier, reticle carrier, or durable used in the manufacture of semiconductors. AMHS subsystems include stockers (also referred to as material storage and retrieval systems), interbay transport devices, and intrabay transport devices. Interbay transport devices move carriers from one stocker to another as well as between bays, while intrabay transport allows movement of a carrier directly to the production equipment either from a stocker or from another production equipment in the bay. Automated interbay and intrabay transport vehicles are often more generally referred to as automatic guided vehicles (AGVs), rail guided vehicles (RGVs), or any type of overhead transport/overhead hoist transport (OHT), and overhead vehicles (OHVs). Software used for implementing AMHS activities includes material control system (MCS) software, which manages the automation of transportation and storage of manufacturing materials.

Notwithstanding the integration of AMHS, MCS software and MES features in current fabs, present tracking capabilities provide only limited information regarding micrologistics (detailed) events being carried out in the fab. For example, in a conventionally generated history of fab lots and equipment, the report information may only include information related to start and stop times for manufacturing operations performed on the work-in-process material lots. However, this information does not relate any data, for example, concerning movement of the lots between operations or storage information. Accordingly, it would be desirable to provide a methodology for providing a more meaningful quantification of the events associated with the flow of product through the automated fab environment.

SUMMARY

The foregoing discussed drawbacks and deficiencies of the prior art are overcome or alleviated, in an exemplary embodiment by a computing system for monitoring activity in an automated fabrication facility occurring as part of a manufacturing process in which work-in-process material lots undergo events including multiple manufacturing operations and intermediate storage operations, the computing system including a computer operably coupled to a manufacturing execution system database having data relating to events including loading and unloading of the work-in-process material lots from manufacturing equipment; loading and unloading of work-in-process material lots from storage equipment; transfer of the work-in-process material lots via an automated material handling system; beginning and completion of individual manufacturing operations; requests for the transfer of the work-in-process material lots by the automated material handling system; and the computer also being operably coupled to an automated material handling system database having data relating to movement of the work-in-process material lots between the manufacturing operations and the storage operations; and a solver product operatively installed on the computer for processing information regarding timing of the events and information regarding operation of the automated material handling system to generate a report regarding performance of the automated fabrication facility, wherein the report identifies information regarding a sequence of events having occurred in the manufacturing process.

TECHNICAL EFFECTS

As a result of the summarized invention, a solution is technically achieved in which MES and AMHS event data is combined and processed sequentially to generate an integrated report including fab micrologistics performance.

BRIEF DESCRIPTION OF THE DRAWINGS

Referring to the exemplary drawings wherein like elements are numbered alike in the several Figures:

FIG. 3(a) illustrates an exemplary fab report that may be generated using the system and method of FIG. 2;

FIG. 3(b) is a schematic diagram that graphically depicts the historical micrologistics events information presented in the report of FIG. 3(a);

DETAILED DESCRIPTION

Disclosed herein is a tracking system and method for creating a meaningful quantification of the events associated with the flow of product through an automated fab environment. The automated fab provides the opportunity to track micrologistics events, since the systems controlling automation generate a trail of data documenting the steps taken in coordinating the flow of product between operations. In the embodiments described herein, the general approach taken is the identification of the structure of the micrologistics process being carried out in the fab, and the creation of a meaningful description of this process from available sources of data through data processing on a computer. Briefly stated, this may be carried out by: (1) defining key fab micrologistics events; (2) identifying relationships of available data to key events; and (3) combining and processing events data sequentially and by joining to arrive at a desired view of fab micrologistics performance with all relevant attributes.

Figure 1A:
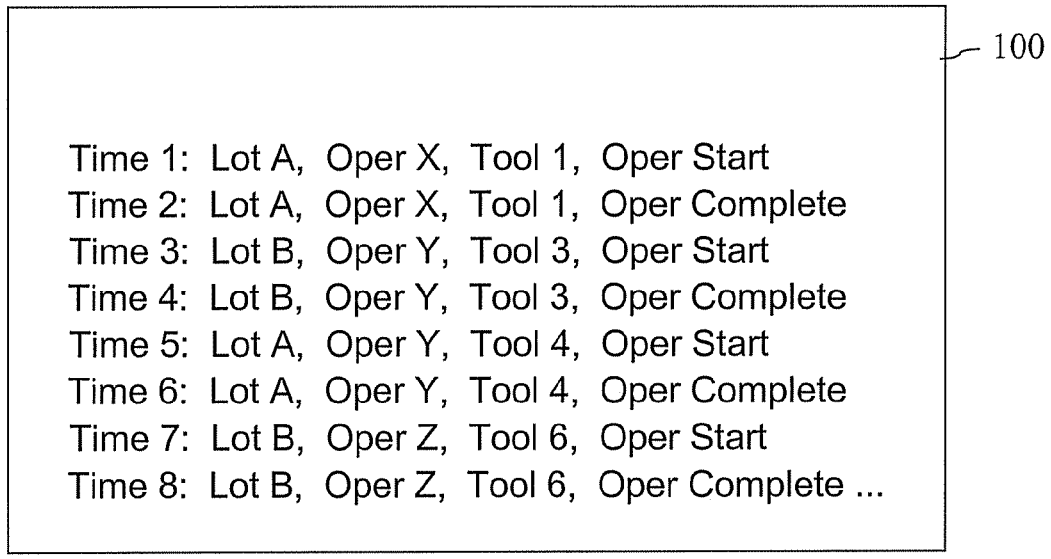
FIG. 1(a) illustrates an exemplary fab report limited to information concerning start and stop times for manufacturing operations performed on work-in-process material lots.
Figure 1B:
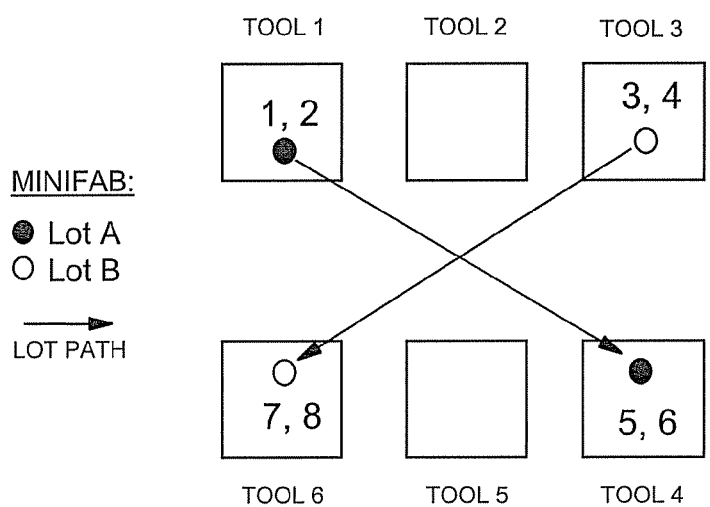
FIG. 1(b) is a schematic diagram that graphically depicts the historical manufacturing operation information presented in the report of FIG. 1(a)

Referring initially to FIG. 1(a), there is shown an exemplary fab report 100 generated for an automated fab. As can be seen, the information therein is essentially limited to data concerning start and stop times for manufacturing operations performed on work-in-process material lots (e.g., lot A, lot B) using various manufacturing equipment present in the fab. From this report, FIG. 1(b) is a schematic diagram that graphically depicts the historical manufacturing operation information presented in the report of FIG. 1(a). In summary, lot A was processed by implementing Operation X at Tool 1 from Time 1 to Time 2. From Time 3 to Time 4, lot B was processed with Operation Y at Tool 3. Subsequently, lot A was processed by Operation Y at Tool 1 from Time 5 to Time 6. Finally, lot B was processed by Operation Z at Tool 6 from Time 7 to Time 8. Such information relates solely to the MES related data of the fab, and does not provide data concerning the movement of product between operations, storage locations, or any other aspect of the AMHS of the fab.

Figure 2:
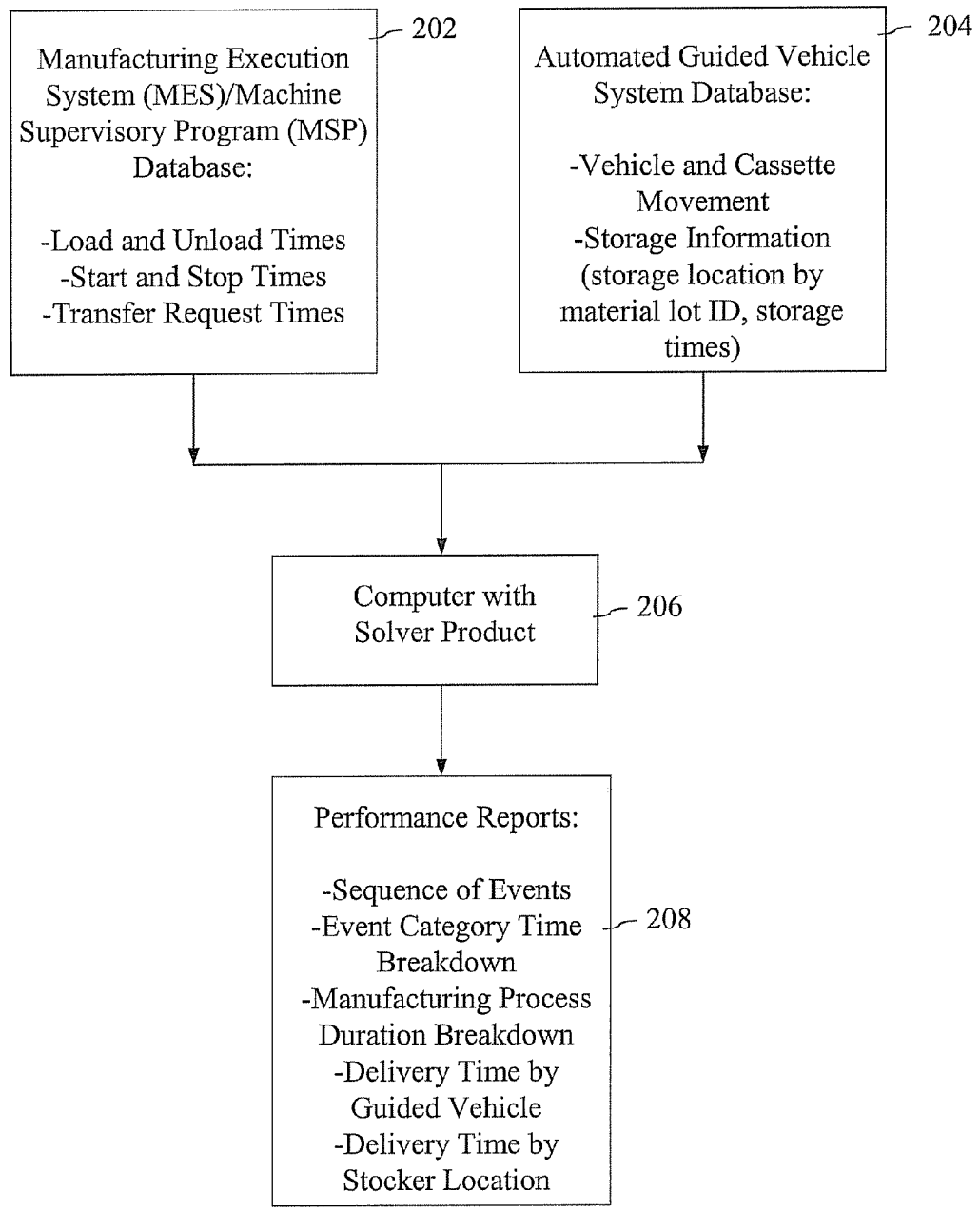
FIG. 2 is a schematic block diagram illustrating a micrologistics tracking system and method for an automated fab, in accordance with an exemplary embodiment of the invention.

Therefore, in accordance with an embodiment of the invention, FIG. 2 is a schematic block diagram illustrating a micrologistics tracking system 200 and associated method for an automated fab. In the embodiment depicted, the system utilizes tracking data from both the MES aspects and the AMHS aspects of a fab. For instance, database 202 includes tracking information provided by a MES and associated machine supervisory program (MSP). Such information may include, but is not necessarily limited to: processing load and unload times of the work-in-process material lots at each of the manufacturing operations; processing start and stop times of each of the manufacturing operations performed on the work-in-process material lots; and requests for the automated transfer of work-in-process lots, as well as the time each automated transfer request is made.

In addition, database 204 includes tracking information provided by an AMHS included within in the fab. Such information may include, but is not necessarily limited to: movement of AGV's and associated cassettes containing the work-in-process material lots for purposes of transferring the work-in-process material lots between the manufacturing and storage operations; storage load and unload times of the work-in-process material lots stored in the intermediate storage operations; a lot ID of each of the work-in-process material lots and an ID of each automatically guided vehicle used to transport each work-in-process material lot.

As further illustrated in FIG. 2, the information contained in databases 202, 204 is made available to a computer 206 in communication therewith, the computer 206 including a solver product associated therewith. As outlined in further detail herein, the computer 206 (with solver product) is configured to process both the MES and AMHS database information with respect to timing of the events and information regarding operation of the MES and AHMS to generate reports 208 regarding performance of the automated fabrication facility.

In exemplary embodiment, such micrologistics reports generated by the computer 206 and solver product include information such as, but not necessarily limited to: a sequence of events having occurred in the manufacturing process; a breakdown of time spent over an entire duration of the manufacturing process into various event categories; a duration of at least one given event in the manufacturing process for at least one work-in-process material lot; specific identification information (e.g., for an automatically guided vehicle, a storage location, a manufacturing operation location, a manufacturing process ID, a lot ID, etc.); location of the intermediate storage operation relative to the location of the manufacturing operation; and time of delivery from the intermediate storage operation to the manufacturing operation.

With regard to various event categories described above, such categories may include, but are not necessarily limited to: queue time, a return time, manufacturing processing time, a delivery time, a staging period, a wait period between the request for a work-in-process material lot to be transferred and the execution of the request, and a wait period following loading/unloading of the work-in-process material lot on the manufacturing equipment before either the commencement of the manufacturing operation or the request for transfer of the lot, respectively. Furthermore, the duration of a given event may refer to, for example, the duration of loading and unloading at a given manufacturing operation, the duration of processing at a given manufacturing operation, the duration of movement between a given processing operation and a given storage operation, the duration of a given storage operation, and the duration of pendancy of one or more tracking requests.

FIG. 3(a) illustrates an example of a micrologistics report 300, such as may be generated through the system 200 of FIG. 2. As compared with the report 100 of FIG. 1(a), report 300 provides much more comprehensive fab information, in terms of both MES and AMHS information, equipment loading/unloading information, storage information, and request for automated transfers, for example. By way of comparison, the entries of the limited fab report of FIG. 1(a) are identified in FIG. 3(a) by the arrows. As a result of this "micrologistics" information, a more comprehensive schematic diagram of the fab operations can be generated from the report 300, as shown in FIG. 3(b).

In generating the meaningful description of events associated with the flow of a product through an automated fab environment, the solver product executed by computer 200 utilizes predefined, key micrologistics events associated with the specific fab in which it is used, along with identified relationships of available data to key events. In terms of a semiconductor fab example, a computational model descriptive of a sequence of significant logistical events characterizing the flow of the work-in-process material lots between and across the manufacturing operations and intermediate storage operations may be generated, such as shown in event flow diagram 400 of FIG. 4.

Figure 4:
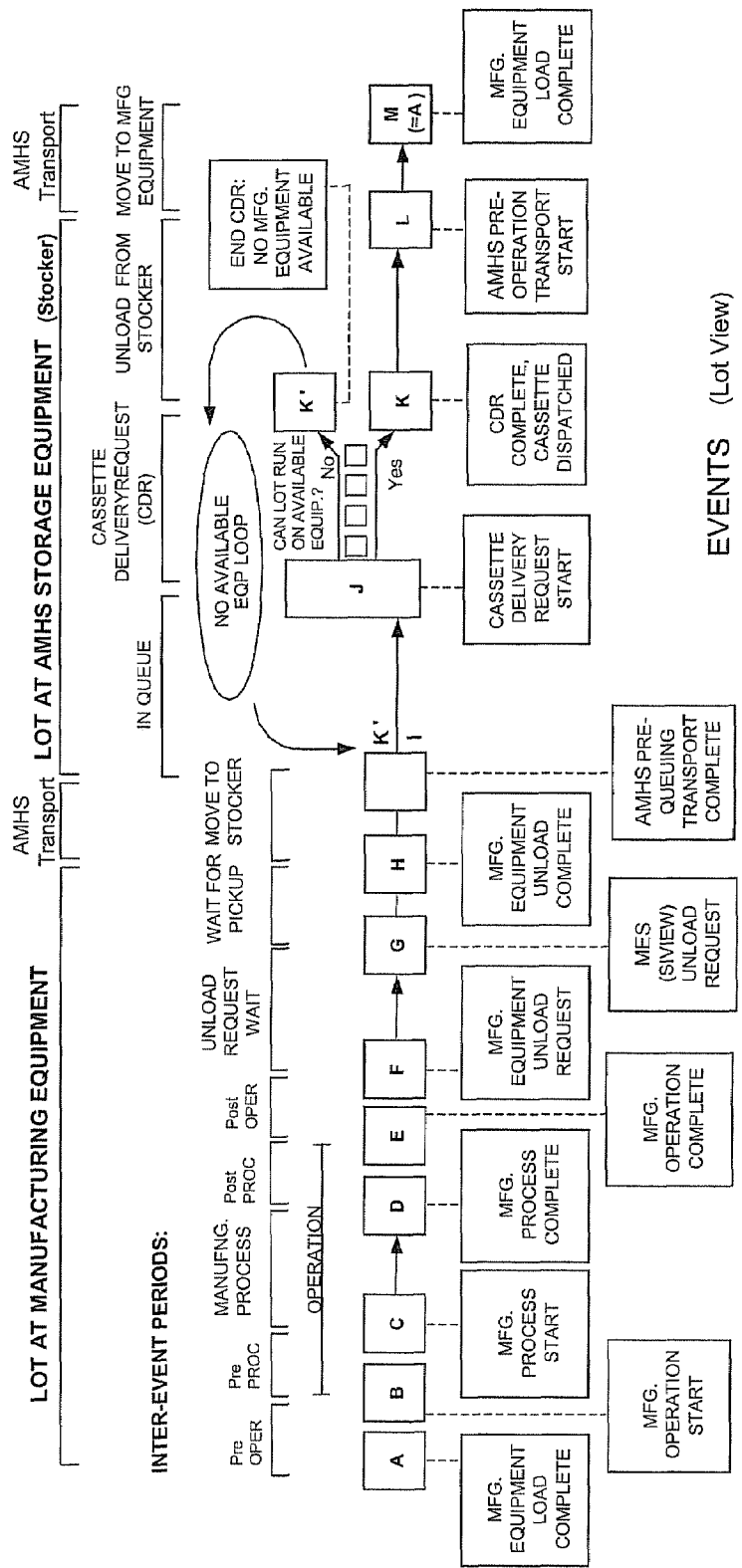
FIG. 4 is schematic diagram depicting a model descriptive of a sequence of significant logistical events characterizing the flow of the work-in-process material lots between and across the manufacturing operations and intermediate storage operations of a fab.

The logistical events (blocks A through M) depicted in FIG. 4 represent a predetermined series of the smallest meaningful events needed to describe the movement of lots through the fab. In particular, logistical events include loading and unloading of the work-in-process material lots from manufacturing equipment (e.g., blocks A, H); loading and unloading of work-in-process material lots from storage equipment (e.g., blocks J-L); transfer of the work-in-process material lots via an automated material handling system equipment (e.g., blocks K', I); beginning and completion of individual manufacturing operations equipment (e.g., blocks B-E); and requests generated by a computer implemented manufacturing execution system for the transfer of the work-in-process material lots by an automated material handling system equipment (e.g., blocks F, G).

Key event attributes may then be derived from the broader context of the overall event sequence. Source data for each of the component event types is overlayed to produce a full micrologistics history for the fab. The relationship to surrounding events allows significant value to be added to the data. Event properties ultimately made available include, for example: Lot ID/product fields, Process ID/process fields, Manufacturing Equipment, AMHS Equipment.

Figure 5:
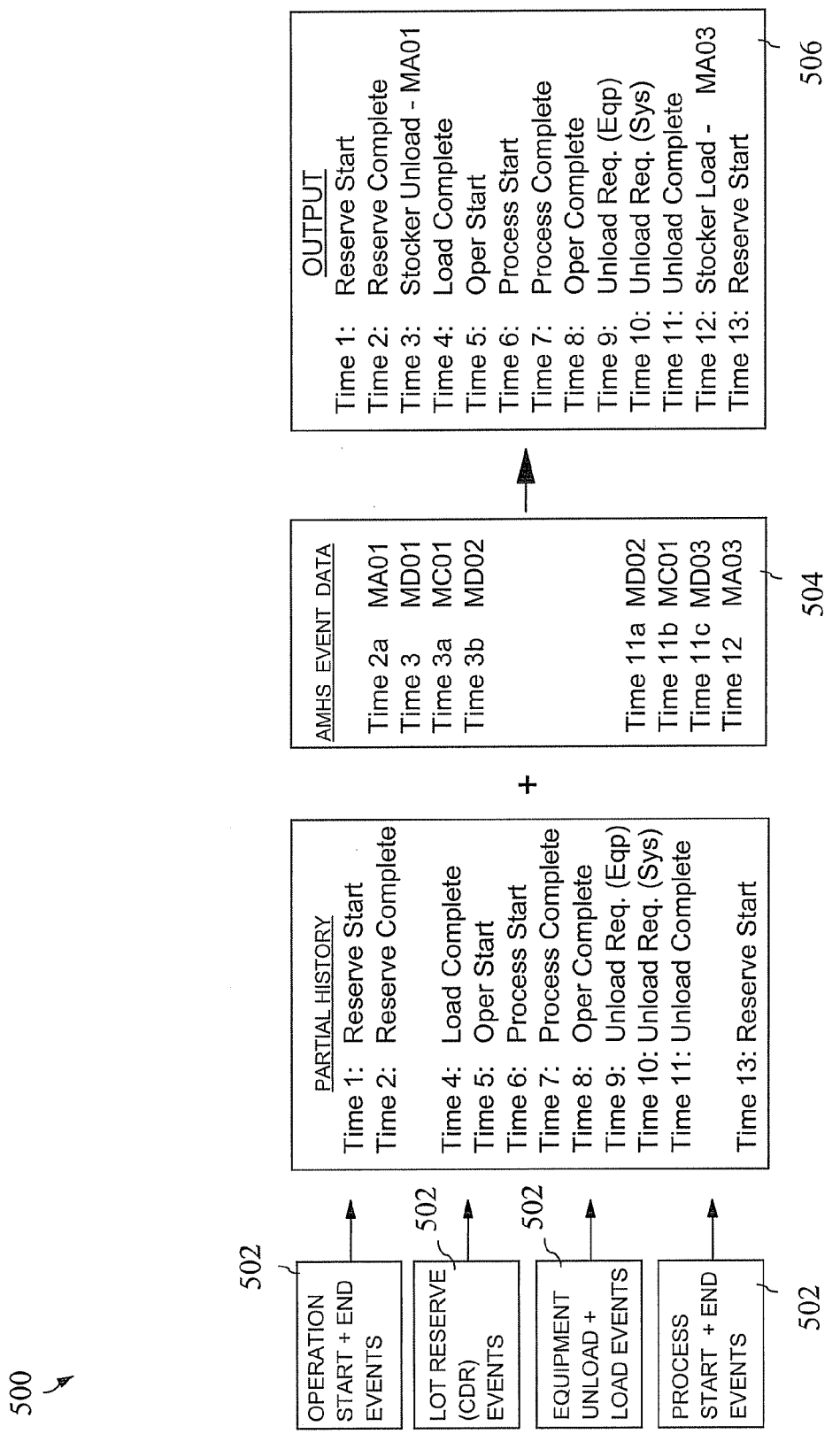
FIG. 5 is a block diagram illustrating the integration of MES type event data and AMHS data into a unified, sequential output that includes a dataset describing key events and attributes, in accordance with a further exemplary embodiment of the invention.

By initially defining key fab micrologistics events and identifying the relationships of available data to the key events, the computer solver product can then process data regarding timing of the logistical events in a sequential manner to produce a set of output data, wherein performance of the fabrication facility with regard to the logistical events may be monitored and retrospectively analyzed. For example, the block diagram 500 shown in FIG. 5 illustrates one example of how the solver product conceptually integrates MES type event data 502 and AMHS data 504 into a unified, sequential output 506 that includes a dataset describing key events and attributes. In one embodiment, the various MES data 502 is intermediately integrated into a partial history 508 before being combined with the AMHS data 504.

Through the use of the above described micrologistics tracking system and method, several benefits may be realized. For instance, performance characteristics of specific storage equipment units associated with each logistical event of the automated material handling system may be calculated by combining and processing data available from the automated material handling system and at least portions of the data regarding timing of the logistical events. In addition, the generated data can be used to identify specific AMHS equipment for AMHS events by interpreting a sequence of simple time-location points for each cassette is in the context of the Dispatch and Operation Start/End events to determine the identities of the AMHS equipment (stockers) selected to store each lot before and after each manufacturing operation.

Furthermore, atypical sequence handling events may be identified by (for example) assigning to event record a value for the current sequence of two events, allowing atypical and standard sequences each to be quantified easily. Still other uses for micrologistics tracking include lot/cassette mapping as cassette ID is generally known while lot ID is initially unknown for most event types. Thus, a timeline of lot-cassette relationships is constructed, allowing lot ID to be extended to all events. In addition to providing the history for any given lot, this allows fab performance to be analyzed in terms of product-related attributes.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computing system for monitoring activity in an automated fabrication facility occurring as part of a manufacturing process in which work-in-process material lots undergo events including multiple manufacturing operations and intermediate storage operations, the computing system comprising:

a computer operably coupled to a manufacturing execution system database having data relating to events including:

loading and unloading of the work-in-process material lots from manufacturing equipment;

loading and unloading of work-in-process material lots from storage equipment;

transfer of the work-in-process material lots via an automated material handling system;

beginning and completion of individual manufacturing operations;

requests for the transfer of the work-in-process material lots by the automated material handling system; and the computer also being operably coupled to an automated material handling system database having data relating to movement of the work-in-process material lots between the manufacturing operations and the storage operations; and a solver product operatively installed on the computer for processing information regarding timing of the events and information regarding operation of the automated material handling system to generate a report regarding performance of the automated fabrication facility, wherein the report identifies information regarding a sequence of events having occurred in the manufacturing process.

2. The system of claim 1, wherein the computer is configured to track a lot ID of each of the work-in-process material lots and an ID of each automatically guided vehicle used to transport each work-in-process material lot, and wherein the report further identifies the lot ID of the work-in-process material lot with every event in the manufacturing process.

3. The system of claim 1, wherein the computer is configured to associate a manufacturing process ID with each event for each material lot.

4. The system of claim 1, wherein the report further includes information regarding a breakdown of time spent over an entire duration of the manufacturing process into various event categories.

5. The system of claim 4, wherein the event categories include one or more of a queue time, a return time, a manufacturing processing time, a delivery time, a staging period, a wait period between the request for a work-in-process material lot to be transferred and the execution of the request, and a wait period following one of loading and unloading of the work-in-process material lot on the manufacturing equipment before either the commencement of the manufacturing operation or the request for transfer of the lot, respectively.

6. The system of claim 1, wherein the report further includes information regarding a duration of at least one given event in the manufacturing process for at least one work-in-process material lot.

7. The system of claim 6, wherein the duration of the at least one given event is one of a duration of loading and unloading at a given manufacturing operation, duration of processing at a given manufacturing operation, duration of movement between a given processing operation and a given storage operation, duration of a given storage operation, and duration of pendancy of one or more tracking requests.

8. The system of claim 6, wherein the report further includes information for at least one of a specific automatically guided vehicle, a specific storage location, a specific manufacturing operation location, a specific manufacturing process ID, and a specific lot ID.

9. The system of claim 1, wherein the report further includes information regarding location of the intermediate storage operation relative to the location of the manufacturing operation and time of delivery from the intermediate storage operation to the manufacturing operation.

* * * * *